(12) United States Patent
Davidson

(10) Patent No.: US 7,559,225 B2
(45) Date of Patent: Jul. 14, 2009

(54) ARTIFICIAL THROAT

(75) Inventor: Peter Davidson, Huizen (GB)

(73) Assignee: Imperial Chemical Industries PLC, London (GB)

( * ) Notice: Subject to any disclaimer, the term of this patent is extended or adjusted under 35 U.S.C. 154(b) by 83 days.

(21) Appl. No.: 10/562,721

(22) PCT Filed: Apr. 29, 2004

(86) PCT No.: PCT/NL2004/000286

§ 371 (c)(1),
(2), (4) Date: Oct. 18, 2006

(87) PCT Pub. No.: WO2005/003757

PCT Pub. Date: Jan. 13, 2005

(65) Prior Publication Data

US 2007/0051162 A1   Mar. 8, 2007

(30) Foreign Application Priority Data

Jul. 2, 2003 (EP) .................................. 03077083

(51) Int. Cl.
*G01N 30/72* (2006.01)
(52) U.S. Cl. ...................... 73/23.34; 73/23.3; 73/31.01; 73/864.81; 73/865.7
(58) Field of Classification Search ................. 73/23.3, 73/23.35, 864.81–864.83, 865.7, 23.34, 31.01; 137/3, 11

See application file for complete search history.

(56) References Cited

U.S. PATENT DOCUMENTS 3,128,994 A * 4/1964 Hungate .................. 366/160.1

(Continued)

FOREIGN PATENT DOCUMENTS

BE    1010605 A3 * 11/1998

(Continued)

OTHER PUBLICATIONS

Roberts et al., "Simulation of Retronasal Aroma Using a Modified Headspace Technique: Investigating the Effects of Saliva, Temperature, Shearing, and Oil on Flavor Release," *Journal of Agricultural and Food Chemistry*, 1995, vol. 43, pp. 2179-2186.

(Continued)

*Primary Examiner*—David A. Rogers
(74) *Attorney, Agent, or Firm*—Jones Day

(57) ABSTRACT

The present invention relates to an artificial throat for simulating aroma release comprising—a tube (1) having an inlet (2) and an outlet (3) and having an upper portion (4), a middle portion (5) and a lower portion (6);—a sample supply system (12) debouching at the upper portion of the tube;—an inlet closure (9) for closing and opening the inlet;—an outlet closure (10) for closing and opening the outlet;—a gas ventilation system (13) debauching at the lower portion of the tube for providing a gas flow, such as an air flow, through the tube. The invention also relates to an assembly for simulating and analyzing aroma release comprising an artificial throat and an analyzing apparatus, such as a mass-spectrometer. Furthermore the invention relates to a method for simulating and analyzing aroma release by means of an artificial throat. Aroma release according to the invention means the release of volatile compounds from substances such as food and drinks, which compounds are transported by means o a gas flow.

22 Claims, 1 Drawing Sheet

U.S. PATENT DOCUMENTS

| | | | | |
|---|---|---|---|---|
| 3,140,598 | A * | 7/1964 | Dunham | 73/23.4 |
| 3,287,088 | A * | 11/1966 | Seevers | 436/30 |
| 3,702,619 | A * | 11/1972 | Son | 137/3 |
| 3,897,679 | A * | 8/1975 | Guild | 73/61.52 |
| 4,835,109 | A * | 5/1989 | Trisciani et al. | 436/178 |
| 4,883,505 | A * | 11/1989 | Lucero | 95/154 |
| 5,042,501 | A * | 8/1991 | Kenny et al. | 600/532 |
| 5,448,062 | A * | 9/1995 | Cooks et al. | 250/288 |
| 5,479,815 | A * | 1/1996 | White et al. | 73/23.3 |
| 6,054,683 | A * | 4/2000 | Bremer et al. | 219/388 |
| 6,149,957 | A * | 11/2000 | Mandralis et al. | 426/387 |
| 6,325,475 | B1 * | 12/2001 | Hayes et al. | 347/2 |
| 6,354,135 | B1 * | 3/2002 | McGee et al. | 73/23.34 |
| 6,672,129 | B1 * | 1/2004 | Frederickson et al. | 73/1.06 |
| 6,907,796 | B2 * | 6/2005 | Bremer et al. | 73/863.11 |
| 7,343,782 | B2 * | 3/2008 | Damer et al. | 73/31.03 |
| 2001/0045475 | A1 | 11/2001 | Reinders et al. | |
| 2007/0271997 | A1 * | 11/2007 | O'Brien | 73/23.37 |

FOREIGN PATENT DOCUMENTS

| | | |
|---|---|---|
| EP | 0819937 | 1/1998 |

OTHER PUBLICATIONS

Lee, "A Suggested Instrumental Technique for Studying Dynamic Flavor Release from Food Products," *Journal of Food Science*, 1989, vol. 51, No. 1, pp. 249-250.

Soeting et al., "A Mass Spectrometric Method for Measuring Flavour Concentration/Time Profiles in Human Breath," *Chemical Senses*, 1988, vol. 13, No. 4, pp. 607-617.

Linforth et al., "Measurement of Volatile Release in the Mouth," *Food Chemistry*, 1993, vol. 48, pp. 115-120.

Van Ruth et al., "Comparison of Dynamic Headspace Mouth Model Systems for Flavour Release from Rehydrated Bell Pepper Cuttings," *Developments in Food Science*, 1994, pp. 59-64.

International Search Report for PCT/NL2004/000286 dated Jul. 14, 2004.

* cited by examiner

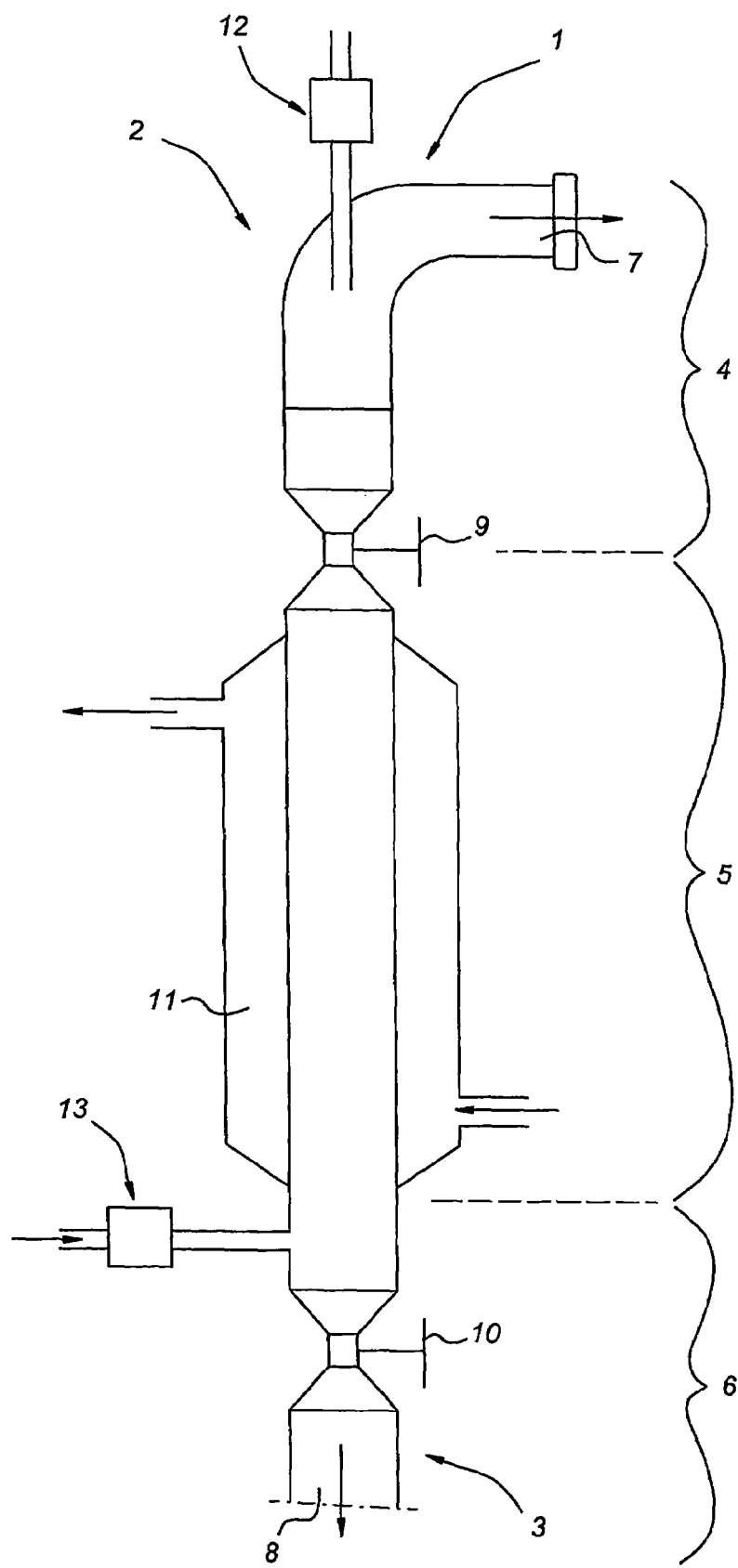

ARTIFICIAL THROAT

CROSS REFERENCE TO RELATED APPLICATION

This application is the National Phase application of International Application No. PCT/NL2004/000286, filed Apr. 29, 2004, which designates the United States and was published in English. This application, in its entirety, is incorporated herein by reference.

The present invention relates to an artificial throat for simulating aroma release. The invention also relates to an assembly for simulating and analyzing aroma release comprising an artificial throat and an analyzing apparatus, such as a mass-spectrometer. Furthermore the invention relates to a method for simulating and analyzing aroma release by means of an artificial throat. Aroma release in this disclosure means the release of volatile compounds from substances such as food and drink, which compounds are transported by means of a gas flow.

An artificial throat, that can be used to simulate and analyze aroma release, is not known yet. In US 2001/0045475 A1 a chewing apparatus is described that simulates the chewing process and analyzes the volatile compounds released during the chewing and kneading process in the apparatus. Analogously to the present invention one could identify this apparatus with 'artificial mouth', although the apparatus is not referred to in these terms as such in US 2001/0045475 A1. From the description below it will become clear that the artificial throat simulates an essentially different process than the process that is simulated with the chewing apparatus from US 2001/0045475 A1.

From research efforts is has become more and more clear that aroma release from food not only takes place during the chewing process but also, and probably to a much greater extent, during swallowing and subsequent exhalation. This will be explained in more detail below.

In the last two decades, a major research effort was dedicated to the development of model systems to model the release of volatiles from food products. Product perception is believed to be related to aroma release as well as taste, and availability of a model system would provide a preliminary screen and would save money and time spent on working with panels.

All the models developed since are mimicking aroma release in the mouth and are based on the same principle: a certain amount of water containing aroma compounds and other ingredients of interest (polysaccharides, proteins, fat or oil) is put in a vessel and stirred or shaken and heated (usually to 37° C.). Air is sampled from the headspace or nitrogen is purged through the liquid phase. The volatile compounds present in the stream of gas originating from the model system are analyzed on-line or batch-wise usually by direct Mass Spectrometry (MS). One could say that this method is more or less similar to the chewing apparatus from US 2001/0045475 A1 or 'artificial mouth', as it is described above.

All kinds of apparatus related and product related parameters have been studied using these model systems, which has increased insight in the process of aroma release in general.

However, more recent theories stress the importance of swallowing for aroma release of liquids and other food products. The release during chewing warming up and cooling down, and dilution with saliva of the sample in the mouth (the conventional focus of model systems) is only marginally important compared to the aroma release just after swallowing. In literature scientists introduced the 'swallow-breath'; 5-15 ml of air which is pushed out of the nose immediately after swallowing and which was in close masticatory contact with the food or drink in the mouth. This plug of air plays a very important role in aroma perception. Since the emergence of mass-spectrometric methods for sufficiently sensitive and fast real-time analysis of volatiles in human breath, it has become clear that the highest aroma release signal is generally found in the first exhalation after swallowing. It was shown that no gas is transferred from the oral cavity to the nasal cavity as long as no opening of the barrier formed by the tongue and the soft palate occurs by swallowing (or by vigorous tongue and mouth movements). A protocol was developed recently, that increased reproducibility of in vivo aroma release measurements of liquids by control of breathing and swallowing and thus reconfirming the importance of swallowing and exhalation for aroma release.

In vivo aroma release of liquid systems occurs during exhalation, immediately after swallowing. The majority of the sample disappears into the oesophagus during swallowing, but a thin layer of the liquid sample remains on the surface of the pharynx. During the subsequent exhalation, a steep gradient exists between the thin liquid layer on the surface of the pharynx and the exhaled air which passes over this surface. It has been suggested that a major part of the aroma compounds present in this thin liquid layer coating within the throat will release almost instantaneously during this exhalation.

To increase knowledge on this process, mathematical modelling describing this process and in vitro models simulating this process can be of great help. None of the previously developed models take swallowing into account. Thus, a model system is needed in which a thin layer of liquid is exposed to a large air-flow, in order to approach the in vivo release conditions.

In order to verify the outcome of the calculations of these improved mathematical models it is the goal of the present invention to provide an artificial throat that simulates the in vivo aroma release during swallowing of food and subsequent exhalation. Herewith in line it is another goal of the present invention to provide a fast and reliable test for the aroma release properties of flavours. This goal is of great importance in the development of new flavours for the food and drink industry. As mentioned above, the release properties of new flavours are mainly tested by making use of a panel of experts with a very well developed sense of smell and taste. With the present invention the details of individual component release can be studied more exactly, making the design of more balanced, more palatable flavours much easier.

The present invention makes the mentioned goals possible by providing an artificial throat comprising:
  a tube having an inlet and an outlet and having an upper portion, a middle portion and a lower portion;
  a sample supply system debouching at the upper portion of the tube;
  an inlet closure for closing and opening the inlet;
  an outlet closure for closing and opening the outlet;
  a gas ventilation system debouching at the lower portion of the tube for providing a gas flow, such as an air flow, through the tube.

According to the invention, the term 'tube' means in general an object having a wall or walls defining a channel inside the wall respectively walls.

With the artificial throat according to the invention one can simulate and analyze aroma release by flowing a sample through a tube in one direction, subsequently blowing a gas through the tube in the opposite direction of the flow of the sample and finally analyzing the gas after flowing through the tube. The sample will contain the flavours, of which that one wants to analyze the aroma release properties. After flowing through the tube a thin layer of sample will adhere to the tube surface. As is explained above the major part of the aroma compounds present in this thin layer will release almost instantaneously when a gas flow passes through the tube. One can subsequently analyze the aroma compounds in the gas flow by connecting the tube to an analyzing apparatus, such as a mass spectrometer.

According to the invention it is advantageous that the sample supply system debouches above the inlet closure. In this arrangement it is possible to collect a certain amount of sample, before it is passed through the tube.

According to the invention it is also advantageous that the sample supply system comprises multiple supply channels. The advantage is that one can produce a sample containing different flavours or food ingredients or can add saliva.

According to the invention it is furthermore advantageous that the gas ventilation system debouches above the outlet closure, thereby preventing gas from flowing through the outlet of the tube in case the outlet is opened.

In a preferred embodiment of the artificial throat, the gas ventilation system is adapted for providing a gas flow in the direction from the outlet of the tube to the inlet of the tube and in the opposite direction from the inlet of the tube to the outlet of the tube.

In general the sample will flow from top to bottom through the tube, while the subsequent gas flow that enters the tube directly after the sample flow will be in the opposite direction, by providing gas at the lower portion of the tube. However it is advantageous if the gas ventilation system is also adapted to provide a gas flow in the same direction as the sample flow. This can be e.g. obtained by making use of a bellows. In this case a stronger resemblance to the natural breathing process is obtained.

According to the invention it is advantageous that the gas ventilation system is adapted to change the composition of the gas. More preferably the gas ventilation system comprises:
    means to decrease the oxygen content; and/or
    means to increase the carbon dioxide content; and/or
    means to increase and/or decrease the water content.

It is known that the chemical composition of the air that a person exhales is different from the air that a person inhales. More specifically the exhaled air has a lower oxygen content, a higher carbon dioxide content, and a higher water content, respectively, compared to the inhaled air. With the adaption of the gas ventilation system, as it is described above, it now becomes possible to simulate the mentioned differences in composition of inhaled and exhaled air respectively, as mentioned above. This can be reached by adapting the composition of normal air as mentioned above before flowing the gas through the tube. In this way an even stronger resemblance to the natural breathing process can be obtained, compared with the embodiment with only a reversible gas flow.

According to the invention it is even more advantageous if the gas ventilation system, adapted to change the composition of the gas as described in the previous paragraph, shows the following characteristics:
    the means to decrease the oxygen content comprises at least one agent that binds oxygen;
    the means to increase the carbon dioxide content comprises a container, the container comprising carbon dioxide and being connected to the gas ventilation system by a piping.

In another preferred embodiment of the artificial throat, the interior of the tube comprises retention means to improve the retention of a sample at the inner-surface of the tube. The improved retention can be obtained mechanically, e.g. by increasing the surface roughness of the tube. The improved retention can also be obtained by a physical or chemical effect, e.g. by applying an inner coating with different physical or chemical properties than the material of the tube itself.

It is preferred that upon using the artificial throat, the tube is in an upright position. This position will facilitate the flow of the sample from the upper part to the lower part of the tube and corresponds to the natural flow of food and drink in the human body.

In a preferred embodiment the artificial throat according to the invention is provided with temperature control means. Preferably these temperature control means are adapted to influence the temperature of the tube wall and/or influence the temperature of the gas flow through the interior of the tube. A preferred embodiment of the temperature control means comprises an outer tube, which outer tube is connected to a piping system, at which the outer tube and/or the piping system comprises heating means. The advantage of applying such temperature control means is that it is possible to simulate the heating effect of relatively cold food located in the warmer mouth or throat on the one hand and the heating effect of relatively cold inhaled air by the lunges and the throat, during the subsequent exhalation.

In a preferred embodiment of the artificial throat according to the invention, a control system is provided, at which the control system is adapted to:
    open the inlet closure for passing a sample after opening the outlet closure; and/or
    open the inlet closure after a predetermined amount of sample has been introduced into the tube above the inlet closure; and/or
    close the outlet closure before providing gas; and/or
    open the inlet closure before providing gas; and/or
    controlling the gas ventilation system to exhaust a single discharge of gas; and/or
    controlling the gas ventilation system to exhaust repeated discharges of gas for simulating natural breathing.

With such a control system it is possible to perform automatically several steps for simulating and analyzing aroma release with the artificial throat. It is not a requirement that all those steps are performed in combination or in the order as they are listed above.

The invention furthermore relates to an assembly for simulating and analyzing aroma release comprising an artificial throat and an analyzing apparatus, at which the analyzing apparatus is connected to the inlet of the artificial throat.

In a preferred embodiment of this assembly of an artificial throat and an analyzing apparatus, the analyzing apparatus is a mass-spectrometer. Using mass spectrometry has the advantage that the composition of the components in a sample can be detected directly without the need for pre-treatment of the sample. Furthermore it is a relatively fast analyzing method, resulting in specific data with respect to the composition.

The invention furthermore also relates to a method for simulating and analyzing aroma release which method comprises:
    A. flowing a sample through a tube in one direction
    B. transporting a gas through the tube in the opposite direction of the flow of the sample
    C. analyzing at least part of the gas after flowing through the tube.

With this method the swallowing of food and the subsequent aroma release upon exhalation by a person can be simulated and at the same time can be analysed. Preferably in step C a mass-spectrometer is used.

An alternative method for simulating and analysing aroma release comprises an alternative step B, compared to the method described in the previous paragraph, which alternative step B comprises:
- transporting a gas through the tube in the direction of the flow of the sample;
- collecting the gas after flowing through the tube;
- adapt the composition of the collected gas;
- transporting the collected and adapted gas in the opposite direction of the flow of the sample.

In this alternative method it is preferred that the composition of the collected gas is adapted at least by:
- decreasing the oxygen content; and/or
- increasing the carbon dioxide content; and/or
- increasing the water content.

With this alternative method a strong resemblance to the natural breathing process can be obtained, that accounts both for the opposite gas flows upon inhalation and exhalation, and the differences in composition of exhaled air and inhaled air.

The invention will now be made clear with reference to the accompanying drawing, in which a side-view is shown of an artificial throat according to a preferred embodiment.

FIG. 1 shows a tube 1 having an inlet 2 and an outlet 3 and having an upper portion 4, a middle portion 5 and a lower portion 6. In a practical embodiment the tube will be made from glass, at least at the middle portion thereof, the inlet and/or the outlet can also comprise plastic, such as teflon.

In the embodiment of FIG. 1 the artificial throat comprises a tube. However in other embodiments it is conceivable that one uses a container.

An end 7 of the inlet is adapted to be connected to an analyzing apparatus (not shown) such as a mass-spectrometer. An end 8 of the outlet is adapted to be connected to a drain.

Furthermore FIG. 1 shows an inlet closure 9 for closing and opening the inlet and an outlet closure 10 for closing and opening the outlet. In practise these closures will comprise a valve or the like, or can comprise a surrounding plastic part of the tube.

At the middle portion 5 of the tube 1 temperature control means 11 are provided. In this embodiment the temperature control means comprise an outer tube, which is connected to a piping system, comprising a liquid or a gas. Preferably the outer tube and/or the piping system comprises heating means. In another embodiment it is possible that the temperature control means 11 are also located at (parts of) the lower portion 6 and the upper portion 4 of the tube. Furthermore it is conceivable that the temperature control means comprise a heating element disposed at the tube.

At the upper portion 4 of the tube 1 a sample supply system 12 debouches. The sample supply system 12 supplies a sample comprising a number of flavours to the tube. In a preferred embodiment the sample supply system comprises multiple supply channels, such as multiple syringes.

At the lower portion 6 of the tube 1 a gas ventilation system 13 debouches. The gas ventilation system 13 is adapted to provide a gas flow, at least in the direction from the outlet of the tube to the inlet of the tube, but preferably also in the opposite direction, namely from the inlet of the tube to the outlet of the tube. Preferably the gas ventilation system 13 debouches above the outlet closure.

The gas ventilation system 13 can be of a design as known per se and in another embodiment according to the invention can also have a connection with the upper portion 4 of the tube.

In most cases the gas ventilation system will provide a flow of air to the tube. Not shown in the FIGURE are means that are part of the gas ventilation system and that are meant to adapt the composition of the gas flow. More specifically these means:
- decrease the oxygen content;
- increase the carbon dioxide content;
- increase and/or decrease the water content.

Preferably such means will comprise at least:
- one agent, that binds oxygen, such as haemoglobin;
- collecting container of a known volume;
- one or more containers that comprise carbon dioxide and/or water, which containers are connected to the collecting container and are adapted to supply a predetermined amount of carbon dioxide and/or water to the collecting container.

With the embodiment of the artificial throat as described above, it is possible to simulate and analyse in vivo aroma release according to the following method.

A predetermined amount of sample comprising various flavours is supplied to the inlet 2 by means of the sample supply system 12. Next the inlet closure 9 and the outlet closure 10 are opened causing the sample to flow through the tube towards the end 8 of the outlet, thereby leaving a thin coating of sample at the inner-surface of the tube. In a next step the gas ventilation system 13 transports a gas through the tube in the opposite direction of the flow of the sample.

In an alternative method the gas that is transported through the tube 1, first is transported through the tube in the direction of the flow of the sample, e.g. by sucking in air through the inlet 2. Next this gas is collected and is adapted with respect to the chemical composition of the gas, before it is transported again through the tube in the opposite direction of the flow of the sample.

In both methods upon transporting the gas in the opposite direction of the flow of the sample, at least part of the gas after flowing to the tube is analyzed, preferably by a mass-spectrometer.

Preferably with this method the gas ventilation system exhaust repeated discharges of gas in order to simulate natural breathing. The repeated discharges of gas are measured on-line by means of the mass-spectrometer.

The invention claimed is: The invention claimed is:

1. An artificial throat for simulating and analyzing aroma release comprising:
   a tube (1) having an inlet (2) and an outlet (3) and having an upper portion (4), a middle portion (5) and a lower portion (6);
   a sample supply system (12) debouching at the upper portion (4) of the tube (1);
   an inlet closure (9) for closing and opening the inlet (2);
   an outlet closure (10) for closing and opening the outlet (3); and
   a gas ventilation system (13) debouching at the lower portion (6) of the tube (1) for providing a gas flow, such as an air flow, through the tube;
   wherein said sample supply system (12) comprises multiple supply channels.

2. The artificial throat for simulating and analyzing aroma release according to claim 1, comprising:
   the sample supply system (12) debouches above the inlet closure (9).

3. The artificial throat for simulating and analyzing aroma release according to claim 1, wherein said gas ventilation system (13) debouches above the outlet closure (10).

4. The artificial throat for simulating and analyzing aroma release according to claim 1, characterised in that, the wherein said gas ventilation system (13) is adapted for providing a gas flow in the direction from the outlet (3) of the tube (1) to the inlet (2) of the tube and in the opposite direction from the inlet (2) of the tube (1) to the outlet (3) of the tube.

5. The artificial throat for simulating and analyzing aroma release according to claim 1, wherein said interior of the tube (1) comprises retention means to improve the retention of a sample at the inner-surface of the tube.

6. The artificial throat for simulating and analyzing aroma release according to claim 1, characterized in that, the wherein said tube (1) is in an upright position.

7. The artificial throat for simulating and analyzing aroma release according to claim 1, comprising:
a control system is provided,
wherein said control system is adapted to open the inlet closure (9) for passing a sample after opening the outlet closure (10).

8. The artificial throat for simulating and analyzing aroma release according to claim 1, comprising:
temperature control means (11) are provided.

9. The artificial throat for simulating and analyzing aroma release according to claim 8, wherein said temperature control means (11) are adapted to influence the temperature of the tube wall.

10. The artificial throat for simulating and analyzing aroma release according to claim 8, wherein said temperature control means (11) are adapted to influence the temperature of the gas flow through the interior of the tube.

11. The artificial throat for simulating and analyzing aroma release according to claim 8, wherein said temperature control means (11) comprises an outer tube,
wherein said outer tube is connected to a piping system, at which the outer tube and/or the piping system comprises heating means.

12. An assembly for simulating and analyzing aroma release comprising an artificial throat according to claim 1, further comprising an analyzing apparatus, wherein said analyzing apparatus is connected to the inlet of the artificial throat.

13. The assembly for simulating and analyzing aroma release according to claim 12, the wherein said analyzing apparatus is a mass-spectrometer.

14. An artificial throat for simulating and analyzing aroma release, comprising:
a tube (1) having an inlet (2) and an outlet (3) and having an upper portion (4), a middle portion (5) and a lower portion (6);
a sample supply system (12) debouching at the upper portion (4) of the tube (1);
an inlet closure (9) for closing and opening the inlet (2);
an outlet closure (10) for closing and opening the outlet (3);
a gas ventilation system (13) debouching at the lower portion (6) of the tube (1) for providing a gas flow, such as an air flow. through the tube; and
a control system;
wherein said control system is adapted to control the gas ventilation system (13) to exhaust repeated discharges of gas for simulating natural breathing.

15. The artificial throat for simulating and analyzing aroma release according to claim 14, wherein said control system is adapted to open the inlet closure (9) after a predetermined amount of sample has been introduced into the tube above the inlet closure.

16. The artificial throat for simulating and analyzing aroma release according to claim 14, the wherein said control system is adapted to close the outlet closure (10) before providing gas.

17. The artificial throat for simulating and analyzing aroma release according to claim 14, wherein said control system is adapted to open the inlet closure (9) before providing gas.

18. An artificial throat for simulating and analyzing aroma release comprises:
i) a tube (1), comprising:
a) an inlet (2);
b) an outlet (3);
c) an upper portion (4);
d) a middle portion (5); and
e) a lower portion (6);
ii) a sample supply system (12) debouching at the upper portion (4) of the tube (1);
iii) an inlet closure (9) for closing and opening the inlet (2);
iv) an outlet closure (10) for closing and opening the outlet (3); and
v) a gas ventilation system (13) debouching at the lower portion (6) of the tube (1) for providing a gas flow, such as an air flow, through the tube;
wherein said gas ventilation system (13) is adapted to change the composition of the gas, comprising:
i) decreasing the oxygen content; and/or
ii) increasing the carbon dioxide content.

19. The artificial throat for simulating and analyzing aroma release according to claim 18, wherein said gas ventilation system (13) comprises means to increase increases and/or decreases the water content.

20. The artificial throat for simulating and analyzing aroma release according to claim 18, characterized in that; comprising:
at least one agent that binds oxygen to decrease the oxygen content; and/or
a container, wherein said container comprises carbon dioxide and is connected to the gas ventilation system (13) by piping, to increase the carbon dioxide content.

21. A method for simulating and analyzing aroma release, comprises:
(A) flowing a sample through a tube in one direction;
(B) transporting a gas through the tube in the opposite direction of the flow of the sample; and
(C) analyzing at least part of the gas after flowing through the tube;
wherein additional steps may occur after step (A) flowing a sample through a tube in one direction, and prior to step (B) transporting a gas through the tube in the opposite direction of the flow of the sample, comprising:
i) transporting a gas through the tube in the direction of the flow of the sample;
ii) collecting the gas after flowing through the tube; and
iii) adapting the composition of the collected gas;
wherein the adapting step comprises at least one of the following:
i) decreasing the oxygen content;
ii) increasing the carbon dioxide content; and/or
iii) increasing the water content.

22. The method for simulating and analyzing in vivo aroma release according to claim 21, wherein said analysis step (C) comprises a mass spectrometer.

* * * * *